United States Patent [19]

Battle

[11] Patent Number: 4,458,456
[45] Date of Patent: Jul. 10, 1984

[54] APPARATUS AND METHOD FOR PROTECTING STRUCTURES FROM FLOODING WATER

[76] Inventor: Daniel S. Battle, 2473 N. Rampart St., New Orleans, La. 70117

[21] Appl. No.: 182,498

[22] Filed: Aug. 29, 1980

[51] Int. Cl.$^3$ .......................... E04H 9/14; E02B 7/00
[52] U.S. Cl. ............................................ 52/63; 52/83; 52/122.1; 52/169.1; 52/742; 52/746; 405/115
[58] Field of Search ............... 52/169.5, 169.14, 169.1, 52/3, 4, 63, 741, 745, 742, 746, 122.1, 83; 405/90, 91, 115

[56] References Cited

U.S. PATENT DOCUMENTS

| | | | |
|---|---|---|---|
| 2,050,798 | 8/1936 | Kothe | 52/169.14 |
| 3,783,766 | 1/1974 | Boucher | 52/3 |
| 4,019,304 | 4/1977 | Timm | 52/169.5 |
| 4,252,461 | 2/1981 | Colamussi | 405/115 |
| 4,321,774 | 3/1982 | Fish | 52/63 |

FOREIGN PATENT DOCUMENTS

| | | | |
|---|---|---|---|
| 175783 | 6/1961 | Sweden | 52/169.1 |
| 639991 | 12/1978 | U.S.S.R. | 405/115 |

Primary Examiner—John E. Murtagh
Attorney, Agent, or Firm—Bode & Smith

[57] ABSTRACT

An apparatus for protecting structures from flood waters having a channel surrounding the structure to be protected, the channel having at least in part a bottom and side walls with reinforcement means therewithin or attaching a collapsible water-impermeable sheeting which, when not in use would be stored within the channel, and when in use would be raised to an erected position around the entirety of the structure. The sheeting would be sealably anchored within the channel on its lower edge by concrete, and therefore would prevent water from coming into contact with the structure. The apparatus would also have the means for allowing air to communicate between the exterior and the interior structure and a means for covering the channel to protect the sheeting while the sheeting is stored within the channel.

18 Claims, 6 Drawing Figures

APPARATUS AND METHOD FOR PROTECTING STRUCTURES FROM FLOODING WATER

BACKGROUND OF THE INVENTION

The present invention relates to a method of protecting structures from rising flood waters. Even more particularly, the present invention relates to a method of securing the exterior of a structure to prevent rising flood waters from entering the structure and causing damage to the structure and the contents therein.

In the protection of structures, including buildings, homes, carports, etc., one of the most feared occurrences which homeowners have to cope with is the instance of flooding waters. It is very common that flood waters, which have a tendency to rise at a great rate, do often easily rise above the floor level of a home or a building, and result in untold damage to the structure itself, and the contents therein, including furniture, clothing, and even, human lives. It is a known fact that despite homes and buildings being located in "high" areas that flooding does, in fact, occur, even in those areas where it has not occurred in the past. That being the case, no home or building which is on sea level or below, is really immune to rising waters caused by flooding.

At present, there appears to be no comprehensive system for protecting the structure entirely around its exterior from the onslaught of flooding waters. The present state of the art has apparently regarded this particular endeavor as possibly too costly or, no real attempt has been made to render a structure with the capability of being protected against flood waters. Thus, at present, structures and the like, are extremely vulnerable to the effect of rising flood waters, and there is apparently a great need for a method to protect such structure which is readily available to most, if not all, home-owners, particularly, with the increased cost of homes, and the like, a system is necessary to assure that the expensive structures which are being built at the present date can be easily protected and can be secure in the event of rising flood waters.

A single pertinent patent, U.S. Pat. No. 4,019,304, entitled "Method of Temporarily Water-Proofing Parts of Buildings in Anticipation of Floods" issued to Rolando E. Timm, teaches sealing a building with flexible plastic sheets continuously wrapped and sealed therearound from base to above anticipated flood height. All glassed openings are covered with plywood before wrapping building, and drains below anticipated flood height are closed with inflatable bladders. However, what is disclosed in the patent would allow water to seep beneath the structure, thus rendering the house very susceptible to flood seepage from beneath.

SUMMARY OF THE PRESENT INVENTION

The present invention would attack the present problem of the vulnerability of structures to rising flood water in a simple, inexpensive and straightforward manner, beyond the methods presently used. The present invention would provide for a system of rendering a structure flood proof from rising waters by providing a continuous channel around the exterior of the structure wherein a steel channel plate would be set into the channel, defining its walls and floor portions. The channel could be approximately one (1') foot in width and at various depths depending on the characteristics of the soil. In the preferred embodiment the depth would be from three (3') to five (5') feet. The bottom edge of a continuous multi-layer sheeting would be anchored within the channel to the metal channel plate proximate the floor of the channel plate. Liquid concrete would then be poured into the channel to a point above the point where the multi-layered sheeting would be anchored to the metal channel plate. Thus, the multi-layered sheeting would be sealed into the channel, and would serve as a barrier from that point on between flood waters and the structure. In its extended state the sheeting could extend from its anchor point within the channel to a point approximately equal in height to the highest point of the exterior walls. However, while not in use, the sheeting would be folded within the channel, so that once folded away, would be flush with the level of the ground. The channel would be provided with cover plates around the structure, so that the channel and its contents would be protected from the weather while not in use. At the threat of flooding waters, the channel cover could be easily removed and a means, such as a pulley system or jacks, could be utilized to raise the multi-layer sheeting out of the channel and up to a point for attachment to the upper point of the exterior walls, thus providing a continuous barrier around the entire structure against rising flood waters. Also, while in the operative position, fans or the like could be utilized to circulate air between the inside of the structure and the outside.

Thus, it is an object of the present invention to provide a method for protecting a structure against rising flood waters.

It is another object of the present invention to provide an inexpensively constructed system for rendering a house or like structure water impermeable.

It is still a further object of the present invention to provide a system for protecting a structure from flooding waters by providing a sheeting housed within a concrete footing and having the ability to be stored away flush with the ground while not in use.

It is yet a further object of the present invention to provide a flood protection system on a structure which would prevent flooding waters from laterally entering into any ports located in the walls of the structure or from seeping into the structure via the slab of the structure.

It is still a further object of the present invention to provide a system for protecting structures from flooding water with the use of a material essentially which would be multi-layered.

It is still a further object to provide for a means to maintain air circulation within the structure while the sheeting encircles the exterior walls.

BRIEF DESCRIPTION OF THE DRAWINGS

Of further understanding of the nature and object of the present invention, referenced should be had to the following detailed description, taken in conjunction with the accompanying drawings, in which like parts are given like reference numerals and, wherein.

DETAILED DESCRIPTION OF THE PREFERRED EMBODIMENT

Figures 1, 2:
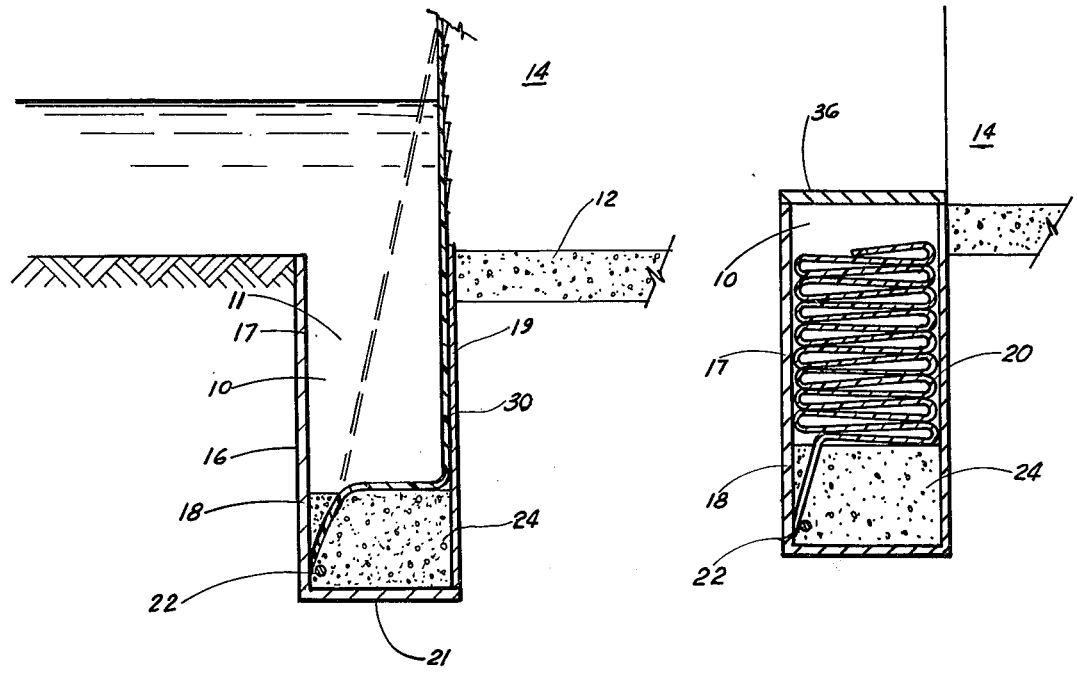
FIG. 1 is a cross-sectional view of an apparatus used in the present system of flood protecting structures.
FIG. 2 is a side view of an apparatus of the preferred embodiment of the present invention illustrating the sheeting while stored away.

FIG. 1 illustrates the preferred embodiment of the apparatus and method of the present invention for protecting the structure against flooding waters. In FIG. 1 there is provided channel 10 as defined by a bottom and side walls, in which a container space 11 has been channeled out around slab 12 of structure 14 proximate slab 12, as shown in FIG. 2. In the preferred embodiment, channel 10 would be a continuous channel around the entire perimeter of structure 14. For those structures which are not on slabs but may be on pilings or tiers channel 10 would be channeled out around the exterior portion of tiers in the like manner. In the preferred embodiment, the width of channel 10 as shown in FIG. 1, would be approximately one (1') foot and the depth would be approximately three to five (3'-5') feet, depending on the soil conditions but, in all instances, to such a depth that pore pressure would not allow water to seep below the bottom of the channel 10 during flood conditions. Provided within channel 10 would be channel reinforcement plate 18, with the lowermost surface of channel reinforcement plate 18 defining the bottom surface 21 of channel 10. Bottom surface 21 would be intermediate and integrally attached, by, for example welding means, to sides 17 and 19 of channel reinforcement plate 18, the entire reinforcement plate 18 defining the walls and sides of channel 10. In the preferred embodiment, channel reinforcement plate 18 would be substantially the same width and heigth of the walls and bottom of channel 10. Following the placement of channel reinforcement plate 18 within channel 10, sheeting means 20 would be provided, the lower edge 22 of which, as illustrated in FIG. 1, would be securely attached to channel reinforcement plate 18 proximate the point where side wall 17 would integrally connect to bottom surface 21 of channel reinforcement plate 18. The attachment could be made with screws, gluing means or some other suitable attachment means. In the preferred embodiment, channel reinforcement plate 18 would be constructed of steel or a like water-impermeable sealable material.

Following the attachment of sheeting 20 to channel reinforcement plate 18, liquid concrete 24 (as illustrated in FIG. 1 in its solidified state), would be poured into continuous channel 10 with the concrete 24 being poured to a level above the point of attachment of sheeting 20 to channel reinforcement plate 18. The solidification of concrete 24 would serve as an additional means of sealably anchoring sheeting 20 as a water-impermeable barrier securely attached within channel 10, for preventing lateral water flow therethrough.

FIG. 2 would illustrate channel 10 with concrete 24 as it has hardened around and sealably anchored the lower edge 22 of sheeting 20 which has been previously attached at points 22 to channel reinforcement plate 18. Further illustrated in FIG. 2 is sheeting 20 as it would be folded into channel 10 while not in use. The depth of that portion of channel 10 for storage of sheeting 20 when not in use must be such that there is sufficient space from the top edge of concrete footing 24 to the top edge of channel 10 for complete storage of sheeting 20. Also illustrated in FIG. 2 is cover plate 36 would be either hingedly attached to channel reinforcement plate 18 at the edge thereof, or completely removed from the top of channel 10. Cover plate 36, in the preferred embodiment, would serve as a means for protecting the interior of channel 10 while sheeting 20 is stored away within channel 10. As further illustrated in FIG. 2, cover plate 36 would seal channel 10 from rain water and the like from entering channel 10 and possibly damaging sheeting 20 while sheeting 20 is in storage.

Figure 3:
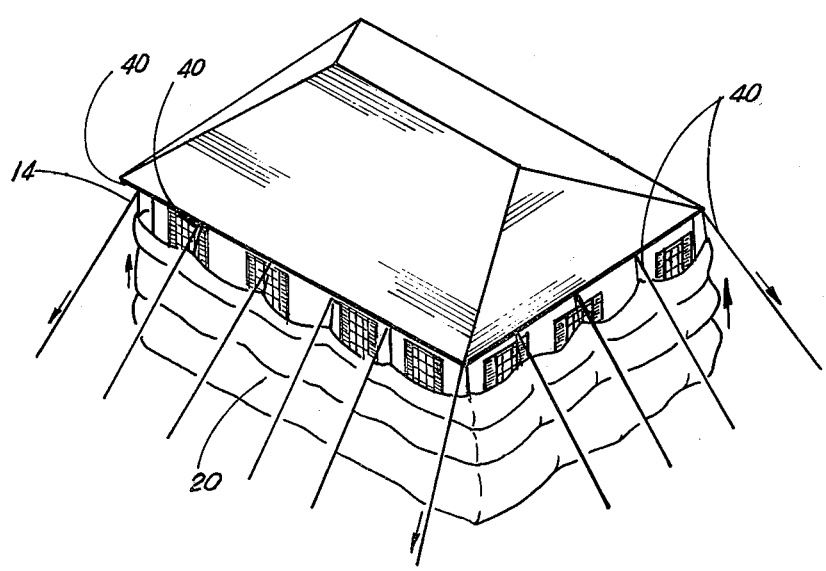
FIG. 3 is a prospective view of the method of raising the sheeting around the structure.

FIG. 3 would illustrate structure 14 which is completely encased in sheeting 20 which has been raised to a level equal to the top of the wall of structure 14 and attached at strategic points thereto, so that sheeting 20 would maintain its extended state during flooding. Please note also that at points of attachment 40 on structure 14 there could be provided a means, such as a system of pulleys and lines, which would be further illustrated in FIG. 4, for assisting in the raising of sheeting 20 up to that level on the exterior walls for attachment to structure 14.

Figure 6:
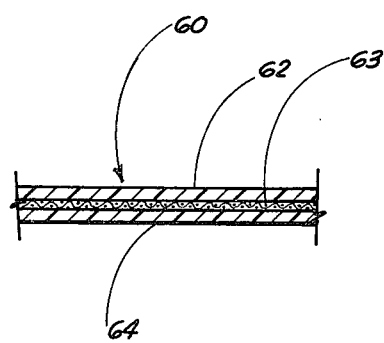
FIG. 6 is a cross-sectional view of multiple layered sheeting of the apparatus.

FIG. 6 would illustrate a cross sectional view of the fabric which would be utilized in the method of protecting structures from flooding waters. It should be noted that the fabric 60 is comprised of outer layer 62, middle layer 63 and inner layer 64. Because of the necessity that the fabric have the ability to withstand the onrush of flooding waters, the fabric must be very flexible yet quite durable. Outer layer 62 would be of a flexible, rubber-based or the like compound which would be impermeable to water or moisture. In order to increase its strength and durability, middle layer 63 would be comprised of a canvas-like material which would have the effect of adding tensile strength to the fabric in the overall structure of the sheeting 20. In inner layer 64, likewise, would be of a rubber-based or the like compound in the event a puncture would ensue on the outer layer perhaps caused by branches or the like floating in the water and striking the sheeting 20 during the flood. In the preferred embodiment, each layer of sheeting 20 would adhere to the layer adjacent to it thus forming a single sheeting means 20. The middle layer, would, in all likelihood, stand at the most strikes against the structure, but since it would not necessarily be water-impermeable, the inner layer 64 would have the added protection of preventing flood waters from seepage into the structure due to the puncture of outer layer 62 and seepage of water through middle layer 63.

Also included in the method, would possibly be jacks or the like means for raising the structure around the house in a continuous fashion, due to the fact that it would be foreseen that sheeting 20 would be of considerable weight and would necessarily be quite difficult to raise without a system of either pulleys and lines of jacks. Also, in the preferred embodiment, there could be pumps or the like means for pumping water out of that portion of the channel on the inside of the sheeting 20, in the event that moisture or water would seep into the area between the channel and the structure during operation of the system.

Figure 4:
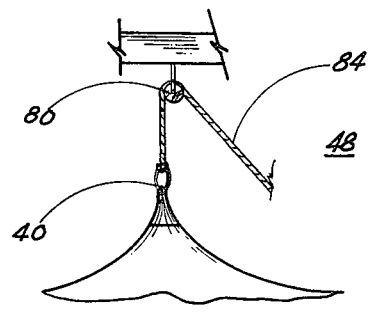
FIG. 4 is an exploded view of the apparatus for raising the sheeting around the structure.
Figure 5:
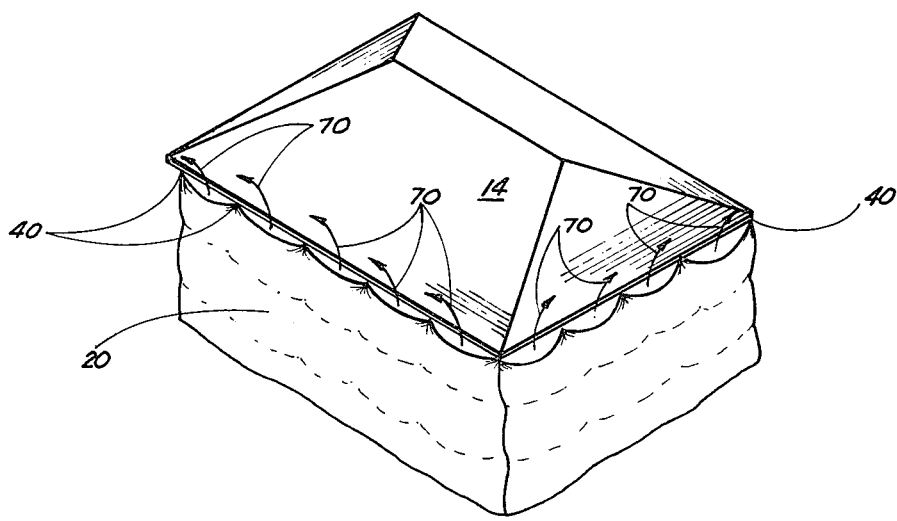
FIG. 5 is a prospective view of a structure while being protected from flooding.

In the operation of the system, FIG. 2 would illustrate sheeting 20 as sheeting 20 is folded within the upper portion of channel 10, with cover 36 sealing the channel 10 from moisture and the like. Therefore, the entire system would be completely out of sight while not in use. In the event that flooding waters are forth coming, the user of the system would simply remove steel plates 36 around the entire channel 10. Depending on the means for lifting the sheeting, a system of pulleys 80 and lines 84 or jacks would be utilized in raising the upper portion of sheeting 20 along the exterior side walls 48 of the structure 14. Sheeting 20 would be provided at points 40 as shown in FIG. 4 with attachment means 40 for allowing the sheeting to be attached at strategic points along the exterior of structure 14 for maintaining the sheeting 20 in its desired erected state when the flood waters would ensue. Also, it should be noted that sheeting 20 would be attached so that air passage between the interior of the structure 14 and the exterior atmosphere would be allowed via the opening between the wall of the structure and the sheeting itself, said air passage indicated by arrows 70 in FIG. 5, the air passage being further facilitated by for example a fan or the like within structure 14.

FIG. 4 would illustrate in exploded view the attachment means for sheeting 20 wherein a suitable length 40 would be attached to a rope or cord 84 which would be threaded pulley 80 and through pulling on the end of cord 84, sheeting 20 would be raised to the desired height and through a looping of the cord 84, sheeting 20 could be maintained at that height until a desirable time when sheeting 20 would be lowered down for restorage back into channel 10.

Because many varying and different embodiments may be made within the scope of the inventive concept herein taught, and because many modifications may be made in the embodiments herein detailed in accordance with descriptive requirement of the law, it is to be understood that the details herein are to be interpreted as illustrative and not in a limiting sense.

What is claimed as invention is:

1. An apparatus for protecting structures from flood waters, comprising:
   a. a channel surrounding the structure to be protected and defining therewithin a container space, said channel comprising at least in part a bottom and integrally connected walls extending upwardly therefrom;
   b. channel reinforcement means within said channel; said reinforcement means comprising a bottom portion intermediate and integral to a first wall portion and a second wall portion, said bottom and wall portions conforming substantially to the bottom and walls of said channel;
   c. collapsible water-impermeable sheeting means attached at its lower end portion to said channel reinforcement means and anchored sealably within said channel for preventing lateral water flow therethrough; said means being movable between a collapsed inoperative position in said container space to an operative erect position extending from said channel a distance upwardly above said channel, and during operation in said erect position, defining a continuous flood barrier surrounding the exterior of said structure;
   d. means connected during operation to said sheeting means at its upper end portion for moving said sheeting means between said collapsed and said operative positions, said means further comprising:
      i. a plurality of lines, one end of each fixedly attached to the upper edge of said sheeting; and
      ii. a plurality of pulleys movably attachable to said structure, each of said pulleys receiving a second end of each of said lines so that when said end of said lines is pulled, said sheeting is raised to the operative position.

2. The apparatus in claim 1, further comprising means for maintaining the sheeting in the operative position.

3. The apparatus in claims 1, further comprising means for allowing air to communicate between the exterior and the interior of said structure while said sheeting is in the operative position.

4. The aparatus in claim 1, further comprising means for closing said channel when the sheeting is stored away.

5. The apparatus in claim 1, wherein said sheeting means is sealably anchored within said channel with concrete poured within said channel to a point above the point of attachment of said sheeting means to said channel reinforcement means; said concrete, in the solidified state, sealably anchoring said sheeting means within said channel.

6. The apparatus in claim 4, wherein means for closing said channel would comprise a removable plate overlying the opening of said channel when said sheeting is stored therein.

7. The apparatus of claim 1, wherein said sheeting means are made of flexible, preferably multi-layered material.

8. A method for installing and operating a flood impermeable protection system around the exterior of a structure, comprising the following steps:
   a. providing a channel surrounding the perimeter of the structure to be protected and defining therewithin a container space, said channel comprising at least in part a bottom and integrally connected walls extending upwardly therefrom;
   b. providing a channel reinforcement means within said channel; said reinforcement means comprising a bottom portion intermediate and integral to a first wall and a second wall, said bottom and wall portions conforming substantially to the bottom and walls of said channel;
   c. providing a collapsible water-impermeable sheeting means for attachment onto said channel reinforcement means;
   d. attaching the lower edge of said collapsible water-impermeable sheeting means onto said channel reinforcement means;
   e. providing an anchoring means for sealably anchoring said sheeting within said channel;
   f. storing the bulk of sheeting within the space defined by the walls of the channel so that the entire sheeting is contained within the channel walls;
   g. providing a means for closing off an open ended top surface of the channel;
   h. installing a means for assisting in lifting the bulk of the sheeting around the exterior of said structure;
   i. removing the channel covering means when flood waters threaten;
   j. raising the entire continuous sheeting around the perimeter of the structure with the use of the lifting means;
   k. securing the sheeting at points around the structure so that the entire upper edge of the sheeting is above the level of the water;
   l. providing a means for allowing circulation of air within the structure while the sheeting is in place around the perimeter walls of the structure.

9. The method in claim 8, wherein the channel surrounding the perimeter of the structure would be approximately one (1') foot in width and three to six feet (3'–6') in depth.

10. The method in claim 8, wherein the reinforcement means would further comprise a metal channel plate defining the walls and bottom of the channel.

11. The method in claim 8, wherein the water-impermeable sheeting means would further comprise a plastic based interior and exterior layers and an intermediate canvas material layer integrally adhering to the interior and exterior layers.

12. The method in claim 8, wherein said collapsible water-impermeable sheeting means is attached onto said channel reinforcement means with suitable attachment means such as screws, bolts, glue, or equivalents thereof.

13. The method in claim 8, wherein the sheeting is anchored within the channel with concrete poured within the channel to a point above the point of attachment of the sheeting means to the channel reinforcement means; the concrete, in the solidified state, sealably anchoring the sheeting means within the channel.

14. The method in claim 8, wherein the top surface of the channel is closed by placing a cover means across the open end of the channel.

15. An apparatus for protecting structures from flood waters, comprising:
   a. a subsurface continuous channel surrounding the structure to be protected defining therewithin a container space, said channel comprising in part a bottom and integrally connected walls extending upwardly therefrom;
   b. metal channel reinforcement plate lying within said channel; said metal reinforcement plate comprising a bottom portion intermediate and integrally attached to a first wall portion and second wall portion, said bottom and wall portions conforming substantially to the bottom and walls of the entirety of said channel;
   c. a collapsible water-impermeable multi-layered sheet attached at its lower end portion to said metal channel reinforcement plate and anchored sealably within said channel for preventing lateral water flow therethrough; said collapsible multi-layered water-impermeable sheet being movable between a collapsed and operative position in said channel to an operative and erect position extending from said channel a distance upwardly above said channel, and during operation in said erected position, defining a continuous flood barrier surrounding the exterior of said structure;
   d. means connected during operation to said collapsible multi-layered water-impermeable sheet for moving said sheet between said collapsed and said operative positions; and
   e. means for allowing air to communicate between the exterior and the interior of said structure while sheeting is in the operative position.

16. The apparatus in claim 15 further comprising means for maintaining said sheet in the operative position.

17. The apparatus in claim 15, wherein the sheeting is sealably anchored within said channel with concrete poured within said channel covering said bottom portion of said channel to a point above the point of attachment of said sheet to said channel reinforcement plate; said concrete, in the solidified state, sealably anchoring said sheet within said channel.

18. The apparatus in claim 15, further comprising a removable metal plate overlying said channel when said sheeting is stored therein.

* * * * *